UNITED STATES PATENT OFFICE.

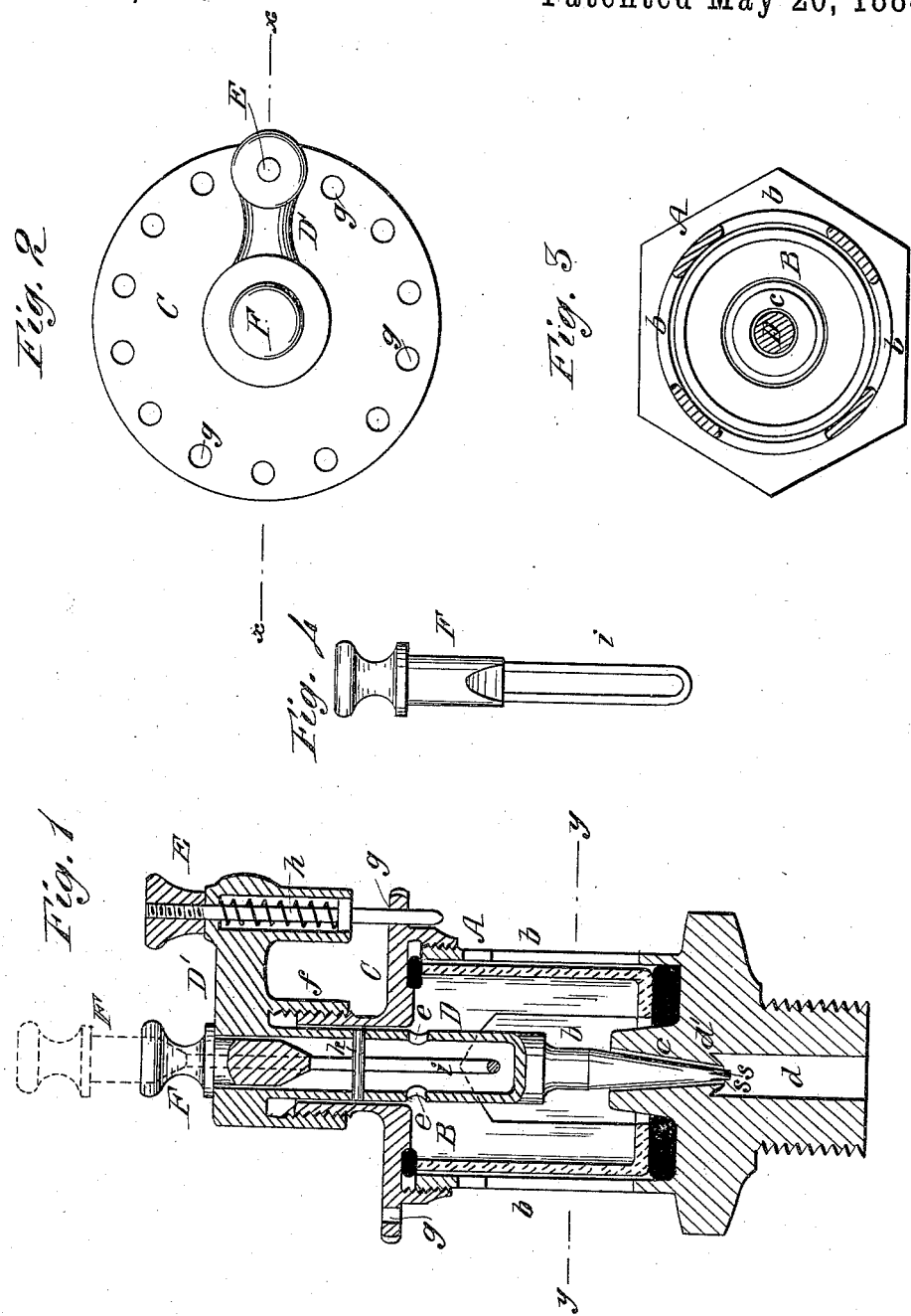

WILLIAM H. THOMAS, OF SANTA ANA, CALIFORNIA.

OIL-CUP.

SPECIFICATION forming part of Letters Patent No. 298,915, dated May 20, 1884.

Application filed October 23, 1883. (Model.)

*To all whom it may concern:*

Be it known that I, WILLIAM H. THOMAS, of Santa Ana, in the county of Los Angeles, and State of California, have invented a new and useful Improvement in Oil-Cups, of which the following is a full, clear, and exact description.

This invention relates to adjustable self-feeding oil-cups; and it consists in certain novel constructions and combinations of parts, whereby every facility is afforded for filling the cup, free from all liability to loss of the filling plug or stopper, a positive lock of the means for adjusting the feed is obtained, and the oil is caused to drop direct from the point of the feeder.

Reference is to be had to the accompanying drawings, forming a part of this specification, in which similar letters of reference indicate corresponding parts in all the figures.

Figure 1 represents a sectional elevation on the line $x\,x$ in Fig. 2 of an oil-cup embodying my invention. Fig. 2 is a plan of the same. Fig. 3 is a horizontal section thereof on the line $y\,y$ in Fig. 1, and Fig. 4 is a longitudinal view of the filling-plug detached.

A' indicates the outer case or holder, which may be constructed, as usual, with a lower tubular screw-shank for attachment of the cup and feed of the oil down through it, and which is further fitted with the usual glass oil-receptacle B, visible through side apertures, $b$, in the case, and with a cap-plate, C, that may be screwed onto the upper end of the case.

D is the adjustable feeder, of cylindrical form, and arranged to turn within and project centrally up through the cap-plate C, and down within a taper hole or seat, $c$, which communicates with the discharge-aperture $d$ in the bottom of the case. The lower portion of said feeder is solid and of conical form, corresponding with the taper hole or seat $c$, for the purpose of controlling and shutting off the discharge from the cup, as in the case of other feeders; but it is of peculiar construction at its lower end or point as and for a purpose that will be hereinafter described. The upper portion of said feeder is made hollow, with one or more side apertures, $e$, in it for the purpose of supplying oil to the receptacle B, and it is fitted or constructed at its top with a sweep or arm, D', up through which the cavity in the body of the feeder is extended, and said sweep is furthermore constructed with an internally-screw-threaded socket, $f$, arranged to fit a male thread upon or around an upward extension or eye on the cap C, so that accordingly as said sweep is turned to the right or to the left will the lower conical end of the feeder D be made to open or close or regulate the discharge through the taper seat $c$ into the drop-aperture $d$. In the outer end of the sweep D' is a vertically-adjustable pin, E, which, when depressed, enters within any one of a circular series of holes, $g$, in the cap-plate C, for the purpose of regulating the feed and for securing the sweep D', so that when the feed is adjusted it cannot be accidentally disturbed. On pulling up said pin, however, from engagement with the cap-plate, the feeder D may be turned by its sweep D', as required. If desired, said locking-pin E may have combined with it a spring, $h$, which will serve to hold the pin in lock with the cap-plate.

F is the filling plug or stopper, arranged to close the mouth or upper open receiving end of the feeder, and provided at its lower end with a shackle, hooked rod, or link-extension, $i$, that projects down within the cavity of the feeder D, and so that when the plug is raised to fill the cup through the feeder, as shown by dotted lines in Fig. 1, it is arrested by the lower or looped end of said shackle coming in contact with a cross pin or stop, $k$, in the feeder D, thus preventing the entire removal or detachment of the stopper, and so avoiding all possibility of its loss. The lower and pointed extremity of the feeder D has a series of longitudinal grooves or cuts, $s$, made in and around it, and the oil-discharge hole $d$ is extended upward to form a countersunk recess, $d'$, around the base of the tapering seat $c$ of the feeder. This construction causes the oil, when the feeder D is raised, to gather at and drop direct from the point and center of the feeder, instead of trickling down the side of the discharge-hole, and to insure this the point of the feeder is made to pass slightly below the countersunk recess $d'$.

Having thus described my invention, I claim as new and desire to secure by Letters Patent—

1. In adjustable self-feeding oil-cups, the combination, with a hollow adjustable feeder or feeding-plug closed at its lower end, of a filling plug or stopper arranged to close the upper or mouth end of said feeder and stop devices within the feeder, arranged to admit of the raising of the filling-plug to charge the cup, but preventing its detachment from the cup, substantially as specified.

2. The filling-plug F, with its attached shackle i, in combination with the hollow feeder D, and its pin or stop k, substantially as and for the purpose specified.

3. The conical raising and lowering feeder D, having a series of longitudinal cuts or grooves, s, down and around its conical or pointed end, in combination with the seat c and lower portion of the cup, having a discharge-hole, d, and a countersunk recess, d', outside of and around the base of said seat, essentially as and for the purpose herein set forth.

WILLIAM H. THOMAS.

Witnesses:
WILLIAM J. NEELY,
GEORGE S. HUPP.